US009225273B2

(12) United States Patent
Sato

(10) Patent No.: US 9,225,273 B2
(45) Date of Patent: Dec. 29, 2015

(54) MOTOR DRIVE METHOD, MOTOR DRIVE DEVICE, AND BRUSHLESS MOTOR

(75) Inventor: Daisuke Sato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 270 days.

(21) Appl. No.: 14/000,237

(22) PCT Filed: Mar. 13, 2012

(86) PCT No.: PCT/JP2012/001718
§ 371 (c)(1),
(2), (4) Date: Aug. 19, 2013

(87) PCT Pub. No.: WO2012/147264
PCT Pub. Date: Nov. 1, 2012

(65) Prior Publication Data
US 2013/0328510 A1    Dec. 12, 2013

(30) Foreign Application Priority Data
Apr. 28, 2011   (JP) ................. 2011-101066

(51) Int. Cl.
*H02P 3/00*   (2006.01)
*H02P 6/06*   (2006.01)
*H02P 6/14*   (2006.01)

(52) U.S. Cl.
CPC . *H02P 6/06* (2013.01); *H02P 6/142* (2013.01)

(58) Field of Classification Search
CPC ....... H02P 3/12; H02P 27/08; B60L 2200/26; F04B 49/06; H02M 7/53873
USPC ...................... 318/375, 376, 400.01, 599, 811
See application file for complete search history.

(56) References Cited

U.S. PATENT DOCUMENTS

| | | | |
|---|---|---|---|
| 6,229,278 B1 * | 5/2001 | Garces et al. | 318/801 |
| 6,806,671 B2 * | 10/2004 | Kusaka et al. | 318/442 |
| 2004/0245949 A1 | 12/2004 | Ueda et al. | |
| 2009/0243522 A1 * | 10/2009 | Suhama et al. | 318/376 |
| 2010/0171453 A1 * | 7/2010 | Yasohara et al. | 318/400.21 |

(Continued)

FOREIGN PATENT DOCUMENTS

| | | |
|---|---|---|
| JP | 05-091754 A | 4/1993 |
| JP | 06-284782 A | 10/1994 |
| JP | 11-059159 A | 3/1999 |

(Continued)

OTHER PUBLICATIONS

International Search Report for Application No. PCT/JP2012/001718, dated Jun. 12, 2012.

(Continued)

*Primary Examiner* — Rina Duda
(74) *Attorney, Agent, or Firm* — RatnerPrestia

(57) ABSTRACT

A method for driving a motor including a stator wound with a coil and a rotor rotatably disposed and confronting the stator, whereby the coil is energized and driven at energizing timing of which phase is determined based on an advance angle amount to rotate the rotor. At this time, it is determined whether or not a power supply voltage supplied to the motor exceeds a predetermined voltage, and when it is determined that the power supply voltage exceeds the predetermined voltage, the advance angle amount is changed to increase a current amount flowing through the coil, for energizing and driving the coil.

11 Claims, 10 Drawing Sheets

(56) References Cited

U.S. PATENT DOCUMENTS

2011/0266982 A1* 11/2011 Rollman ............... 318/376
2012/0032621 A1  2/2012 Asukai

FOREIGN PATENT DOCUMENTS

| | | |
|---|---|---|
| JP | 2001-309550 | 11/2001 |
| JP | 2004-023819 A | 1/2004 |
| JP | 2008-154385 | 7/2008 |
| JP | 2008-253036 | 10/2008 |
| JP | 2008-290664 A | 12/2008 |
| JP | 2009-044868 A | 2/2009 |
| JP | 2012-039784 A | 2/2012 |

OTHER PUBLICATIONS

English Translation of Chinese Search Report dated Jul. 23, 2015 for the related Chinese Patent Application No. 201280013085.6.

* cited by examiner

MOTOR DRIVE METHOD, MOTOR DRIVE DEVICE, AND BRUSHLESS MOTOR

TECHNICAL FIELD

The present invention relates to a motor drive method, a motor drive device, and a brushless motor for driving a motor in such a manner that when a power supply voltage increases and becomes an overvoltage because a large amount of noise is applied to a power supply line of the motor, they are prevented from being affected by the overvoltage.

BACKGROUND ART

As for a car, a mounted buttery serves as power supplies of mounted instruments. A vehicle mounts many instruments, and these instruments operate according to the situation while driving. Therefore, a power supply voltage of the mounted buttery considerably fluctuates compared with a power supply of a general electrical instrument. Furthermore, when the mounted buttery is cut off for some reasons while an engine is driven, it is known that a transient phenomenon called load dump is generated, and a high voltage is generated on a power supply line.

Therefore, conventionally, there is a technique proposed to protect the instruments mounted on the vehicle from an overvoltage such as a surge superimposed on the power supply line of the mounted buttery (refer to Patent Literature 1, for example).

The above conventional technique is configured such that when the surge is generated on the power supply line, a controlling means puts a blower motor circuit into an energized state while the surge is above a predetermined voltage. As a result, the surge flows in the blower motor circuit to be absorbed. The conventional technique reduces a burden of a surge absorbing circuit and the number of surge absorbing elements in this manner.

However, the above-described technique is configured such that when the surge is generated while a blower motor is stopped, the blower motor is energized and driven, and surge energy is absorbed by the blower motor. Therefore, when the surge is generated while the blower motor is energized and driven, the problem is that the surge energy cannot be absorbed more than the surge energy due to the energizing and driving.

CITATION LIST

Patent Literature

PTL1: Unexamined Japanese Patent Publication No. 11-59159

SUMMARY OF THE INVENTION

According to a method for driving a motor in the present invention, by the method for the motor including a stator wound with a coil and a rotor rotatably disposed and confronting the stator, the coil is energized and driven at energizing timing of which phase is determined based on an advance angle amount to rotate the rotor. According to this method, it is determined whether or not a power supply voltage supplied to the motor exceeds a predetermined voltage, and when it is determined that the power supply voltage exceeds the predetermined voltage, the advance angle amount is changed to increase a current amount flowing through the coil, for energizing and driving the coil.

Thus, when the power supply voltage increases and becomes an overvoltage exceeding the predetermined voltage due to an effect of a noise, for example, the motor changes the advance angle amount to increase the current amount and absorb energy of the increased overvoltage while maintaining a present rotational operation without changing the present rotational operation such as the rotating speed, and as a result, a voltage of a power supply line can be prevented from increasing.

In addition, according to the method for driving the motor in the preset invention, when the power supply voltage does not exceed the predetermined voltage, the advance angle amount is controlled to decrease the current amount, and when it is determined that the power supply voltage exceeds the predetermined voltage, the advance angle amount is controlled to increase the current amount.

Thus, when the power supply voltage does not exceed the predetermined voltage, the current amount of the coil is decreased to promote efficiency and lower a noise, and when it exceeds the predetermined voltage, the voltage of the power supply line can be prevented from increasing.

In addition, according to a motor drive device in the present invention, a function that carries out the above-described method is provided, and the coil is energized and driven at the energizing timing based on the advance angle amount.

Furthermore, according to a motor drive device in the present invention, in the motor drive device for a motor including a stator wound with a coil and a rotor rotatably disposed and confronting the stator, the coil is energized and driven at energizing timing of which phase based on an advance angle amount to rotate the rotor. This motor drive device includes an energizing timing generator for generating the energizing timing of the phase based on the advance angle amount, a drive waveform generator for generating a waveform signal for driving the coil, and outputting the waveform signal at timing based on the energizing timing, a PWM circuit for generating a drive pulse signal which is pulse width modulated by the waveform signal supplied from the drive waveform generator, an inverter for energizing the coil based on the drive pulse signal, an overvoltage determining unit for determining whether or not a power supply voltage supplied to the motor exceeds a predetermined voltage, and an advance angle setting unit for setting the advance angle amount to the energizing timing generator. Thus, the advance angle setting unit sets the advance angle amount for the energizing timing generator to increase a current amount flowing through the coil when the overvoltage determining unit determines that the power supply voltage exceeds the predetermined voltage.

According to this configuration, when the power supply voltage increases and becomes an overvoltage exceeding the predetermined voltage due to the effect of the noise, for example, the motor changes the advance angle amount to increase the current amount and absorb energy of the increased overvoltage without changing the present rotational operation such as the rotating speed, and as a result, the voltage of the power supply line can be prevented from increasing.

Furthermore, a brushless motor in the present invention incorporates or integrates the above-described motor drive device.

According to this configuration, the brushless motor is provided with the function to prevent the power supply voltage supplied from the power supply line from increasing.

As described above, according to the method for driving the motor, the motor drive device, and the brushless motor in the present invention, when the power supply voltage becomes the overvoltage due to the effect of the noise, for example, the advance angle amount is changed to increase the current amount flowing through the coil. Therefore, the method for driving the motor, the motor drive device, and the brushless motor can prevent the voltage increase on the power supply line generated while the motor is energized and driven, and perform operations in stable power supply circumstances.

DESCRIPTION OF EXEMPLARY EMBODIMENTS

Hereinafter, a motor drive method, a motor drive device, and a brushless motor according to an exemplary embodiment of the present invention will be described with reference to the drawings.

First Exemplary Embodiment

Figure 1:
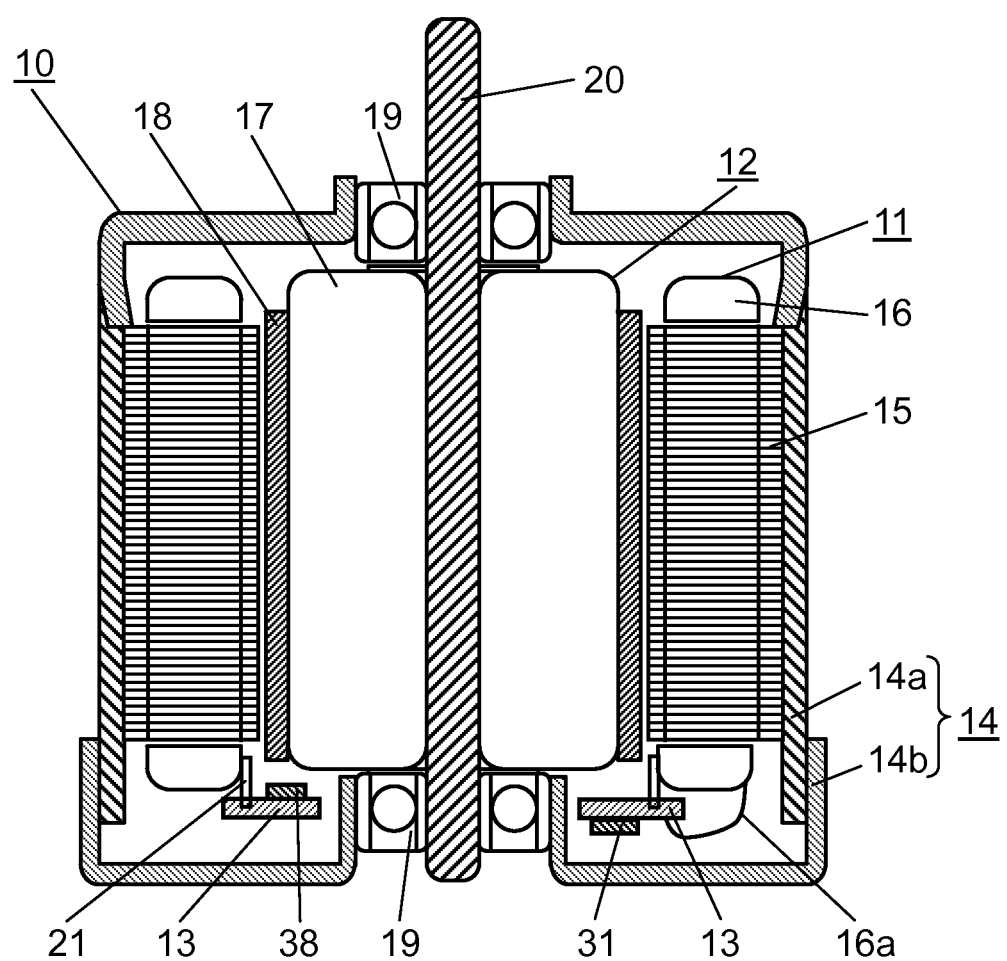
FIG. 1 is a view showing a structure of a brushless motor according to a first exemplary embodiment of the present invention.

FIG. 1 is a view showing a structure of brushless motor 10 according to a first exemplary embodiment of the present invention. According to this exemplary embodiment, a description will be given of a case of an inner rotor type brushless motor in which a rotor is rotatably arranged on an inner periphery side of a stator. The brushless motor according to this exemplary embodiment has coils having a plurality of phases, and is rotationally driven by a signal which is pulse width modulated (hereinafter, referred to as PWM occasionally) for each phase.

As shown in FIG. 1, brushless motor 10 includes stator 11, rotor 12, circuit substrate 13, and motor case 14. Motor case 14 is made of metal formed into a sealed cylindrical shape, and brushless motor 10 is configured in such a manner that stator 11, rotor 12, and circuit substrate 13 are housed in motor case 14. Motor case 14 is composed of case body 14a and case lid 14b, and case lid 14b is mounted on case body 14a, whereby motor case 14 is roughly sealed.

Referring to FIG. 1, stator 11 is configured such that coil 16 is wound around stator iron core 15 with respect to each phase. In this exemplary embodiment, a description will be given of a case where coils 16 are divided into three phases of a U phase, a V phase, and a W phase, respectively which are different in phase by 120 degrees from each other, and each of them is wound around stator iron core 15. Stator iron core 15 has a plurality of salient poles projecting toward an inner periphery side. In addition, an outer periphery side of stator iron core 15 has a roughly cylindrical shape, and its outer periphery is fixed to case body 14a.

Rotor 12 is inserted on an inner side of stator 11 with a space provided between them. Rotor 12 holds a cylinder-shaped permanent magnet 18 around an outer periphery of rotor frame 17, and is rotatably arranged around rotational shaft 20 supported by bearing 19. In other words, a tip end surface of the salient pole of stator iron core 15 and an outer periphery surface of permanent magnet 18 are arranged so as to be opposed to each other.

Furthermore, in brushless motor 10, circuit substrate 13 which mounts various kinds of circuit components 31 is incorporated inside motor case 14. Circuit components 31 compose the motor drive device for controlling and driving the motor. In addition, position detecting sensor 38 such as a hall element is also mounted on circuit substrate 13 to detect a rotational position of rotor 12. Supporting member 21 is mounted on stator iron core 15, and circuit substrate 13 is fixed in motor case 14 through supporting member 21. In addition, each of end parts of coils 16 having the U phase, V phase, and W phase is led out of stator 11 as lead-out wire 16a, and lead-out wire 16a is connected to circuit substrate 13.

The above configuration is provided such that first, stator 11 is inserted into case body 14a and fixed to an inner surface of case body 14a, next, rotor 12 and circuit substrate 13 are housed in case body 14a, and then, case lid 14b is fixed to case body 14a. By this procedure, brushless motor 10 is formed so as to incorporate the position detecting sensor and the motor drive device. In addition, brushless motor 10 may be configured so as to integrate the motor drive device. Especially, a shielding effect is provided because motor case 14 is made of metal, so that an electromagnetic noise can be prevented from being externally emitted from circuit substrate 13 and stator 11. In addition, stator iron core 15 is configured so as to be directly fixed to case body 14a, so that heat generated in stator 11 can be externally emitted through metal motor case 14.

When a power supply voltage and a control signal is externally supplied to brushless motor 10 configured as described above, a drive current is applied to coil 16 by the motor drive device on circuit substrate 13, and an electric field is generated from stator iron core 15. Thus, attractive force and repulsive force are generated by the electric field from stator iron core 15 and an electric field from permanent magnet 18, based on polarities of those electric fields, and rotor 12 rotates around shaft 20 by the above forces.

Next, a description will be given of the motor drive device including position detecting sensor 38 and circuit components 31 mounted on circuit substrate 13, according to this exemplary embodiment.

Figure 2:
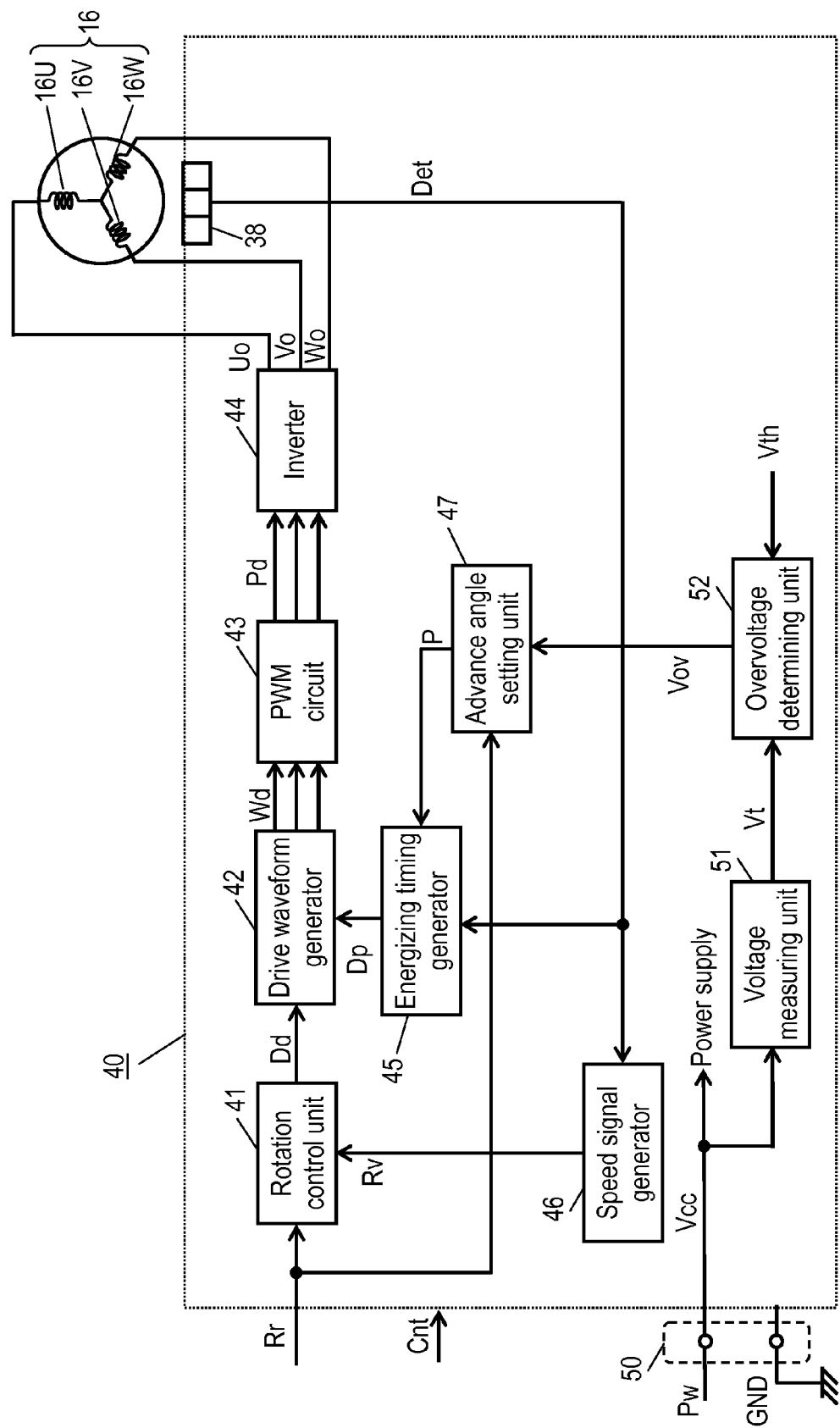
FIG. 2 is a block diagram of a motor drive device according to the first exemplary embodiment of the present invention.

FIG. 2 is a block diagram of motor drive device 40 of brushless motor 10 according to this exemplary embodiment.

Motor drive device 40 includes position detecting sensor 38 corresponding to each of the three phases, rotation control unit 41, drive waveform generator 42, PWM circuit 43, inverter 44, energizing timing generator 45, speed signal generator 46, advance angle setting unit 47, voltage measuring unit 51, and overvoltage determining unit 52. In addition, power supply voltage Vcc is applied from power supply line Pw to power supply terminal 50 in order to drive each circuit of motor drive device 40. For example, in a case of a vehicle, power supply voltage Vcc is supplied from a mounted buttery through power supply line Pw. In addition, motor drive device 40 receives rotation command signal Rr which commands revolutions per minute (rpm) as a specified number of rotations or specified rotating speed, from an external host device, for example, together with various kinds of commands and control signal Cnt.

Rotation command signal Rr is applied to rotation control unit 41. In addition, detected speed signal Rv generated by speed signal generator 46 is applied to rotation control unit 41 as a detected rotating speed. According to this exemplary embodiment, a rotational position of rotor 12 is detected, and detected speed signal Rv is generated based on detected position information, as one example. Rotation control unit 41 generates rotation control signal Dd indicating a drive amount for coil 16, based on rotation command signal Rr and detected speed signal Rv.

More specifically, speed signal generator 46 performs differential operation on the position information obtained from position sensor signal Det from position detecting sensor 38, calculates rotational speed of rotor 12, and outputs it as detected speed signal Rv. Rotation control unit 41 finds a deviation between rotation command signal Rr indicating the specified rotating speed, and detected speed signal Rv indicating the detected rotating speed calculated by speed signal generator 46. Then, rotation control unit 41 generates rotation control signal Dd indicating a torque amount corresponding to the deviation so as to rotate the motor at real speed according to the specified rotating speed. Rotation control unit 41 supplies such rotation control signal Dd to drive waveform generator 42.

Drive waveform generator 42 generates waveform signal Wd for driving coil 16 with respect to each phase, and supplies generated waveform signal Wd to PWM circuit 43. When sign wave drive is applied to coil 16, waveform signal Wd is a sine wave signal, and when a rectangular wave drive is applied to coil 16, waveform signal Wd is a rectangular wave signal. In addition, an amplitude of waveform signal Wd is determined according to rotation control signal Dd. Furthermore, timing to supply waveform signal Wd to PWM circuit 43 is determined according to energizing phase signal Dp from energizing timing generator 45. Based on reference timing, when the timing according to energizing phase signal Dp has a phase in an advance direction, it means an advance angle, and when it has a phase in a delay direction, it means a delay angle.

Pulse width modulation (PWM) circuit 43 performs pulse width modulation (PWM) by using waveform signal Wd supplied from drive waveform generator 42 as a modulating signal with respect to each phase. Thus, PWM circuit 43 supplies drive pulse signal Pd serving as a pulse train signal which is pulse width modulated with waveform signal Wd, to invertor 44.

Invertor 44 applies a current to coil 16 with respect to each phase, based on drive pulse signal Pd, to drive coil 16. Invertor 44 includes a switch element connected to a positive electrode side of a power supply and a switch element connected to a negative electrode side thereof, with respect to each of the U phase, V phase, and W phase. In addition, the switch elements on the positive electrode side and the negative electrode side are connected to each other on a side opposite to the power supply, and this connection part serves as a drive output end to drive coil 16 from invertor 44. Drive output end Uo of the U phase, drive output end Vo of the V shape, and drive output end Wo of the W phase are connected to coil 16U, coil 16V, and coil 16W, respectively through respective lead-out wires 16a. Thus, when the switch element is turned on/off by drive pulse signal Pd in each phase, a drive current from the power supply flows from the drive output end to coil 16 through the ON switch element. Here, drive pulse signal Pd is provided by performing the pulse width modulation with waveform signal Wd, so that when each switch element is turned on/off as described above, each coil 16 is energized by the drive current according to waveform signal Wd.

In this configuration described above, a feedback control loop is formed to control the rotating speed of rotor 12 based on rotation command signal Rr. That is, according to this exemplary embodiment, feedback control is performed to rotate rotor 12 so that rotor 12 is rotating in accordance with the specified rotating speed.

Next, a description will be given of a configuration to generate detected speed signal Rv and energizing phase signal Dp.

First, position detecting sensor 38 mounted on circuit substrate 13 detects a magnetic pole change of permanent magnet 18 of rotating rotor 12, and outputs it as position sensor signal Det. Position sensor signal Det is supplied to energizing timing generator 45 and speed signal generator 46.

Speed signal generator 46 generates detected speed signal Rv based on position sensor signal Det as described above, and supplies it to rotation control unit 41.

Energizing timing generator 45 sets timing of position sensor signal Det as reference timing and generates timing whose phase is shifted from the reference timing by a certain amount of the advance angle. Advance angle amount P is supplied from advance angle setting unit 47 to energizing timing generator 45. Energizing timing generator 45 generates energizing phase signal Dp indicating timing advanced from the reference timing by advance angle amount P. Such energizing phase signal Dp is supplied to drive waveform generator 42. As a result, drive waveform generator 42 outputs waveform signal Wd at timing advanced by energizing phase signal Dp from the reference timing based on position sensor signal Det. That is, motor drive device 40 operates so as to energize and drive coil 16 with waveform signal Wd having the amplitude according to rotation control signal Dd and the phase according to advance angle amount P.

Next, a description will be given of advance angle amount P set for energizing timing generator 45 by advance angle setting unit 47.

Figure 3:
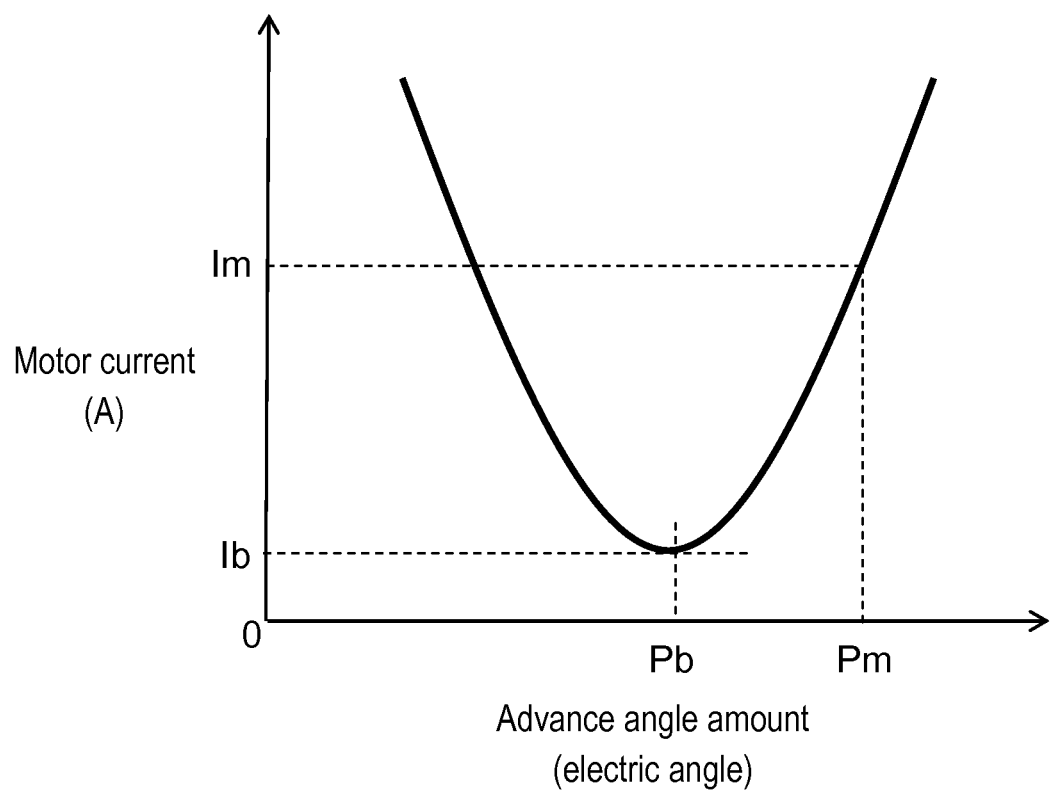
FIG. 3 is a view showing a characteristic example between an advance angle amount and a motor current.

FIG. 3 is a view showing a characteristic example of the advance angle amount corresponding to the energizing timing, and the motor current. Theoretically, when the advance angle amount is changed as shown in FIG. 3 under a certain constant rotating speed, the motor current has a characteristic of having a convex shape toward a bottom, and there is a point in which the motor current shows a minimum value. That is, when the coil is driven with the advance angle amount in which the motor current shows the minimum value, the motor can be efficiently driven. In addition, the advance angle amount in which the motor current shows the minimum value changes depending on the rotating speed. Therefore, according to this exemplary embodiment, rotation command signal Rr is applied also to advance angle setting unit 47, and advance angle setting unit 47 is configured to generate advance angle amount P according to the rotating speed, based on rotation command signal Rr.

According to this exemplary embodiment, by taking advantage of the above characteristic, advance angle amount P in which the motor current shows the minimum value is set for energizing timing generator 45 to promote efficiency at the time of normal operation of the brushless motor 10. In addition, the rotation drive can be realized at the desired rotating speed while the motor current shows the minimum value, so that a sound noise can be lowered.

Furthermore, according to this exemplary embodiment, advance angle amount P is configured to be changed based on power supply voltage Vcc. To provide this configuration, according to this exemplary embodiment, voltage measuring unit 51 and overvoltage determining unit 52 are provided.

Voltage measuring unit 51 measures a voltage value of power supply voltage Vcc supplied to power supply terminal 50, and notifies measured power supply voltage value Vt to overvoltage determining unit 52. Overvoltage determining unit 52 determines whether or not supplied power supply voltage Vcc is an overvoltage which exceeds a predetermined voltage, and applies its determined result to advance angle setting unit 47 as overvoltage determined signal Vov. Since overvoltage determining unit 52 performs the above operation, it holds threshold voltage Vth indicating a predetermined voltage value, for example. When power supply voltage value Vt from voltage measuring unit 51 shows the voltage value which exceeds the threshold voltage Vth, overvoltage determining unit 52 determines to be the overvoltage, and when it shows the voltage value which does not exceed the threshold voltage Vth, overvoltage determining unit 52 determines not to be the overvoltage. Overvoltage determining unit 52 outputs overvoltage determined signal Vov provided based on this determination.

When it is determined not to be the overvoltage in the overvoltage determined signal Vov, advance angle setting unit 47 sets advance angle amount P to decrease the motor current, for energizing timing generator 45, as a normal operation. Meanwhile, when it is determined to be the overvoltage in overvoltage determined signal Vov, advance angle setting unit 47 sets advance angle amount P to increase the current amount flowing through coil 16, for energizing timing generator 45. That is, when it is determined not to be the overvoltage, advance angle setting unit 47 sets advance angle amount P in which the motor current is minimum, like advance angle value Pb in FIG. 3. Meanwhile, when it is determined to be the overvoltage, the advance angle setting unit 47 sets advance angle amount P in which the motor current increases, like advance angle value Pm in FIG. 3.

As described above, motor drive device 40 is configured such that when overvoltage determining unit 52 determines the overvoltage, advance angle setting unit 47 sets advance angle amount P to increase the current amount flowing through coil 16, for energizing timing generator 45. According to this exemplary embodiment, since motor drive device 40 has the above configuration, for example, when power supply voltage Vcc reaches the overvoltage because a serge or noise is superimposed on the power supply line, and a capacitor of the power supply line is charged, advance angle amount P is changed to increase current amount to absorb energy of the overvoltage caused by the surge or the like while the present rotational operation such as the rotating speed is maintained by the feedback control. As a result, the voltage of power supply line Pw is prevented from increasing, power supply voltage Vcc is prevented from fluctuating due to the effect such as the surge or noise, and a stable operation of brushless motor 10 and a stable operation of another electric device connected to power supply line Pw are ensured.

In the above, the description has been given of the case where motor drive device 40 includes overvoltage determining unit 52 and advance angle setting unit 47, but it may have a configuration including a motor drive method to carry out the same function.

Figure 4:
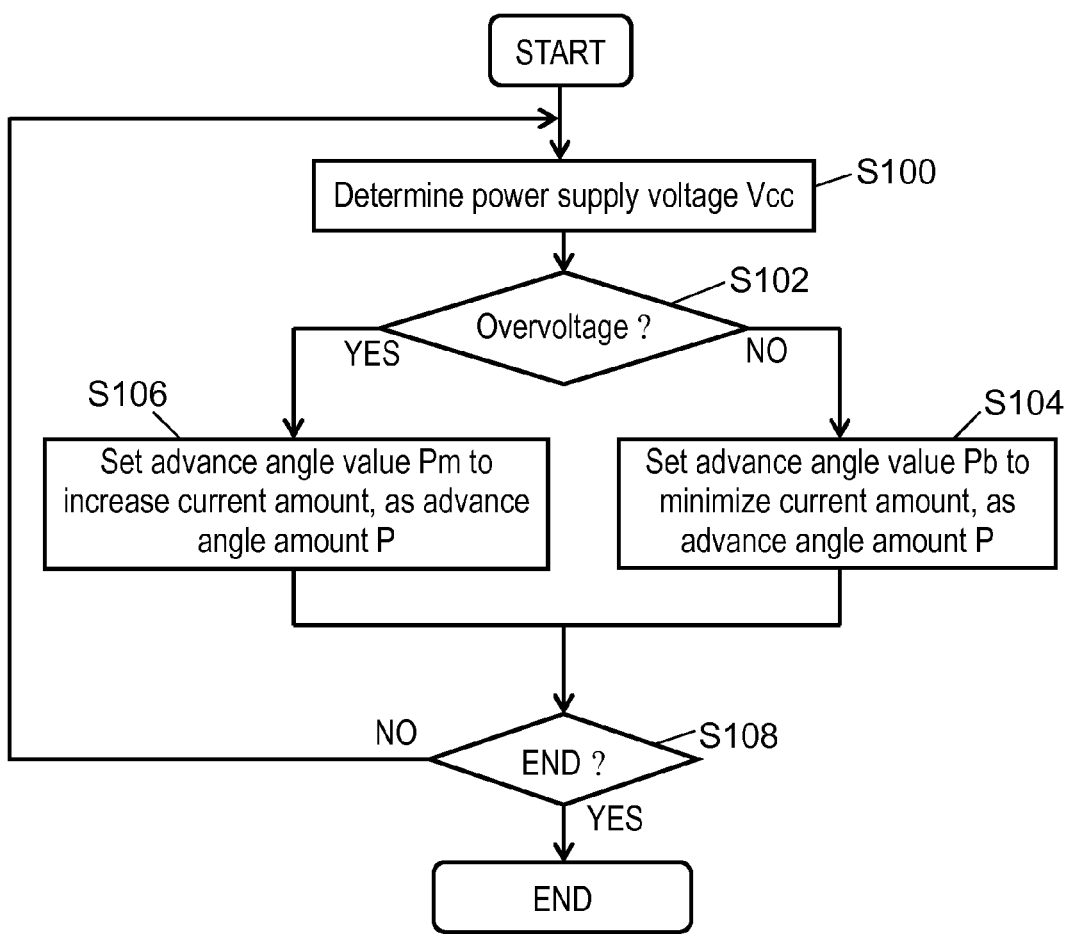
FIG. 4 is a flowchart showing one example of a procedure of a motor drive method according to the first exemplary embodiment of the present invention.

FIG. 4 is a flowchart showing one example of a procedure of the method for driving the motor according to this exemplary embodiment. Referring to FIG. 4, when a process of this motor drive method is started, it is determined first, whether or not power supply voltage Vcc is the overvoltage exceeding a predetermined voltage (step S100). In step S100, when it is determined not to be the overvoltage, the process proceeds on to step S104, but when it is determined to be the overvoltage, the process proceeds on to step S106 (step S102). When it is determined not to be the overvoltage, advance angle value Pb in which the current amount is minimum as shown in FIG. 3 is set as advance angle amount P, for energizing timing generator 45 (step S104). Meanwhile, when it is determined to be the overvoltage, advance angle value Pm in which the current amount is increased as shown in FIG. 3 is set as advance angle amount P, for energizing timing generator 45 (step S106). As long as a process end is not instructed from the host device, for example, the processes from step S100 to step S108 are repeated, and when the end is instructed, the process of this motor drive method is completed (step S108).

As described above, according to the method for driving the motor in this exemplary embodiment, it is determined whether or not power supply voltage Vcc supplied to the motor is the overvoltage exceeding the predetermined voltage, and when it is determined to be the overvoltage, advance angle amount P is changed to increase the current amount flowing through coil 16, and thus coil 16 is energized and driven. When the brushless motor 10 includes the function to carry out the motor drive method as described above, the voltage of power supply line Pw can be also prevented from increasing.

Figure 5:
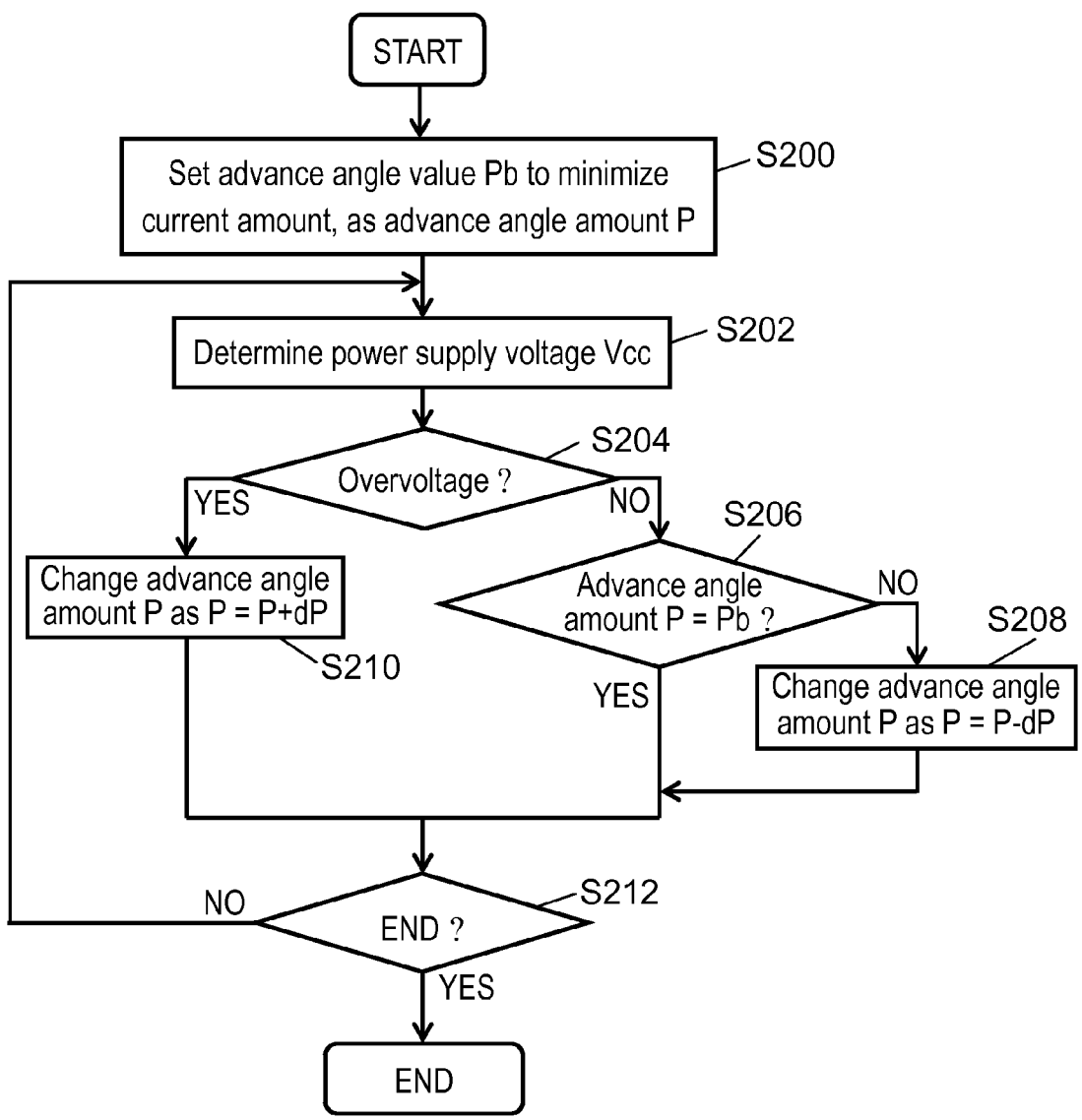
FIG. 5 is a flowchart showing another example of a motor drive method.

Furthermore, FIG. 5 is a flowchart showing another example of a method for driving the motor in this exemplary embodiment. According to the motor drive method shown in FIG. 5, advance angle value Pb in which the current amount is minimum is set first, as advance angle amount P (step S200). Then, it is determined whether or not power supply voltage Vcc is the overvoltage exceeding the predetermined voltage (step S202). In step S202, when it is determined not to be the overvoltage, the process proceeds on to step S206, but when it is determined to be the overvoltage, the process proceeds on to step S210 (step S204).

When it is determined not to be the overvoltage, it is further determined whether or not advance angle value Pb is set as advance angle amount P (step S206). When advance angle value Pb is set as advance angle amount P, the process proceeds on to step S212. Meanwhile, when advance angle value Pb is not set as advance angle amount P, a value provided by subtracting predetermined change value dP from present advance angle amount P is set as new advance angle amount P, and the process proceeds on to step S212 (step S208).

When it is determined to be the overvoltage in step S202, a value provided by adding predetermined change value dP to present advance angle amount P is set as new advance angle amount P, and the process proceeds on to step S212 (step S210).

As long as a process end is not instructed from the host device, for example, the processes from step S202 to step S212 are repeated, and when the end is instructed, the process of this motor drive method is completed (step S212).

By carrying out the processes shown in FIG. 5, when power supply voltage Vcc is not the overvoltage, advance angle value Pb in which the current amount is minimum is set as advance angle amount P. Meanwhile, when the overvoltage is occurred, advance angle amount P is increased by change value dP, and the current amount is also gradually increased. After that, when power supply voltage Vcc is no longer the overvoltage, advance angle amount P is decreased by change value dP, and reaches advance angle value Pb in which the current amount is minimum.

According to the motor drive method shown in FIG. 5 also, it is determined whether or not power supply voltage Vcc is the overvoltage, and when it is determined to be the overvoltage, advance angle amount P is changed to increase the current amount flowing through coil 16, and coil 16 is energized and driven, so that the voltage of power supply line Pw can be prevented from increasing. Furthermore, according to the motor drive method shown in FIG. 5, when it is determined to be the overvoltage, advance angle amount P is gradually shifted from advance angle value Pb, so that temporary fluctuation in the rotating speed due to an abrupt change in advance angle amount P can be prevented, and a sound noise due to that fluctuation can be prevented.

In addition, the description has been given of the case where when it is determined to be the overvoltage, advance angle amount P is increased to increase the current amount in FIGS. 4 and 5, but advance angle amount P may be decreased to increase the current amount.

In addition, in the processes shown in FIG. 5, change value dP may be a value according to power supply voltage Vcc or the voltage of the overvoltage. That is, as the voltage of the overvoltage increases, change value dP is increased. In this operation, power supply voltage Vcc can be appropriately prevented from fluctuating according to the voltage of the overvoltage.

In addition, in the processes shown in FIG. 5, it is preferable to set maximum advance angle amount Pmax which is a limit value when advance angle amount P is increased by change value dP. That is, when increased advance angle amount P exceeds maximum advance angle amount Pmax, a process may be added such that advance angle amount P is limited to maximum advance angle amount Pmax.

In addition, as one specific way for performing this method for driving the motor, it may be configured such that a microcomputer is mounted on circuit substrate 13, and the function of motor drive device 40 is incorporated as a program, to carry out the process of each step in this method. In this configuration, each process including this method for driving the motor can be carried out more flexibly.

Second Exemplary Embodiment

Figure 6:
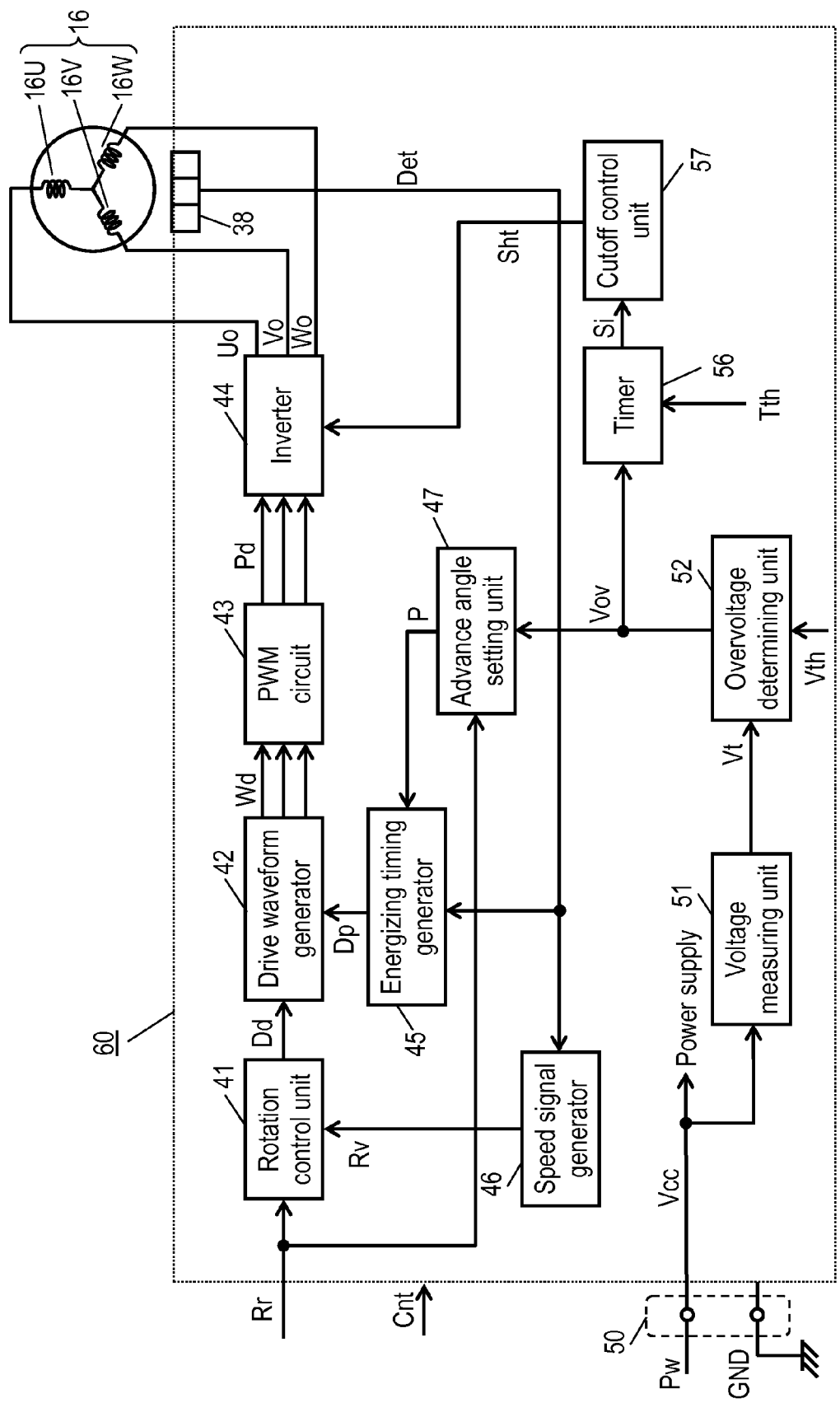
FIG. 6 is a block diagram of a motor drive device according to a second exemplary embodiment of the present invention.

FIG. 6 is a block diagram of motor drive device 60 according to a second exemplary embodiment. In this exemplary embodiment, similar to the first exemplary embodiment, motor drive device 60 is incorporated or integrated in brushless motor 10 shown in FIG. 1. Referring to FIG. 6, the same components as those in FIG. 2 are marked with the same reference marks, and their detailed description is omitted. Motor drive device 60 further includes timer 56 and cutoff control unit 57, compared with motor drive device 40 shown in FIG. 2.

Timer 56 receives overvoltage determined signal Vov from overvoltage determining unit 52. When it is determined to be the overvoltage in overvoltage determined signal Vov, timer 56 starts measuring a time from the determined time. While it is determined to be the overvoltage, timer 56 continues to measure the time from the time when it is determined to be the overvoltage for the first time until the present time so as to measure a period while it is determined to be the overvoltage. When the period of the overvoltage exceeds determination value Tth, timer 56 outputs cutoff command signal Si to cutoff control unit 57. Here, determination value Tth is a value indicating a predetermined time width. In addition, timer 56 stops measuring the time when it is determined not to be the overvoltage in overvoltage determined signal Vov.

When cutoff control unit 57 receives cutoff command signal Si indicating that the period while it is determined to be the overvoltage exceeds determination value Tth from timer 56, it outputs cutoff control signal Sht to inverter 44 to cut off the driving operation of inverter 44. When inverter 44 receives cutoff control signal Sht, it stops the operation to drive coil 16.

Thus, motor drive device 60 includes timer 56 for measuring a lapse of predetermined time from the time when overvoltage determining unit 52 determines the overvoltage, and cutoff control unit 57 for cutting off the current to coil 16 according to cutoff command signal Si. When timer 56 determines that the predetermined time has elapsed, it outputs cutoff command signal Si which commands the cutoff, to cutoff control unit 57.

This exemplary embodiment has the above configuration, so that when power supply voltage increases due to the effect such as a surge or noise and reaches the overvoltage which exceeds the predetermined voltage, advance angle amount P is changed to prevent the voltage of power supply line Pw from increasing. Furthermore, when the voltage increase cannot be sufficiently prevented only by changing advance angle amount P, it is determined to be a real voltage defect and the motor drive is stopped, so that a defective operation of the motor due to the overvoltage can be prevented.

In addition, in the above description, determination value Tth serving as a fixed value is used, but determination value Tth may be a value according to power supply voltage Vcc or the voltage of the overvoltage. That is, as the voltage of the overvoltage increases, determination value is decreased. In this operation, it is possible to take measures on a power supply defect appropriately according to the voltage of the overvoltage, and for example, when an extremely high voltage is applied, the function to take measures on the defect can be promptly operated.

Figure 7:
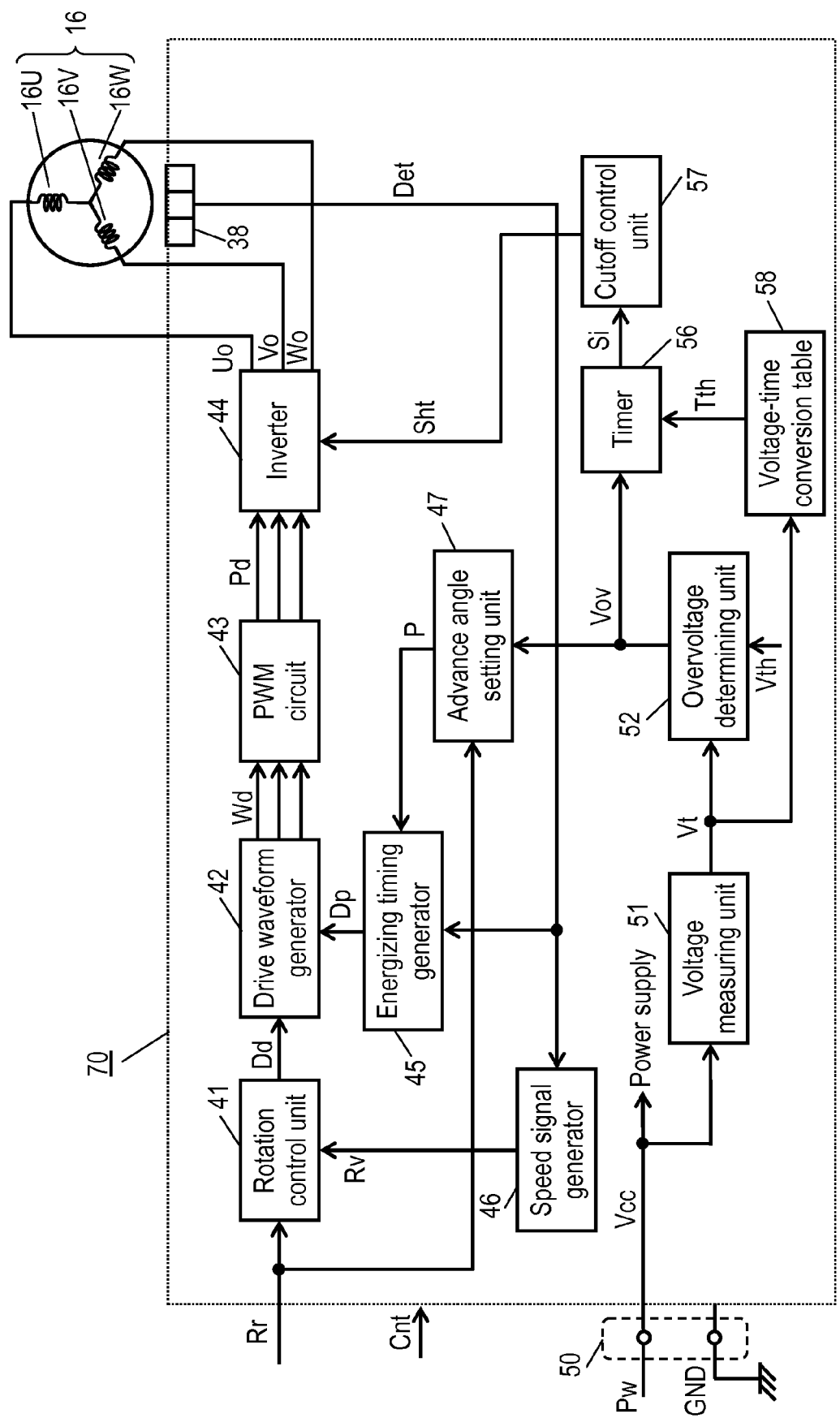
FIG. 7 is a block diagram showing another configuration example of a motor drive device.

FIG. 7 is a block diagram of motor drive device 70 further including the above configuration. Motor drive device 70 in FIG. 7 further includes voltage-time conversion table 58, in addition to the confirmation in FIG. 6. Voltage-time conversion table 58 is a conversion table in which power supply voltage value Vt from voltage measuring unit 51 and determination value Tth are related to each other and stored. With this conversion table, determination value Tth can be a value according to power supply voltage Vcc and the voltage of the overvoltage.

In the above, the description has been given of the case where motor drive device 60 and motor drive device 70 further include timer 56, cutoff control unit 57, and voltage-time conversion table 58, but it may be a configuration including a method for driving the motor to carry out the same function.

Figure 8:
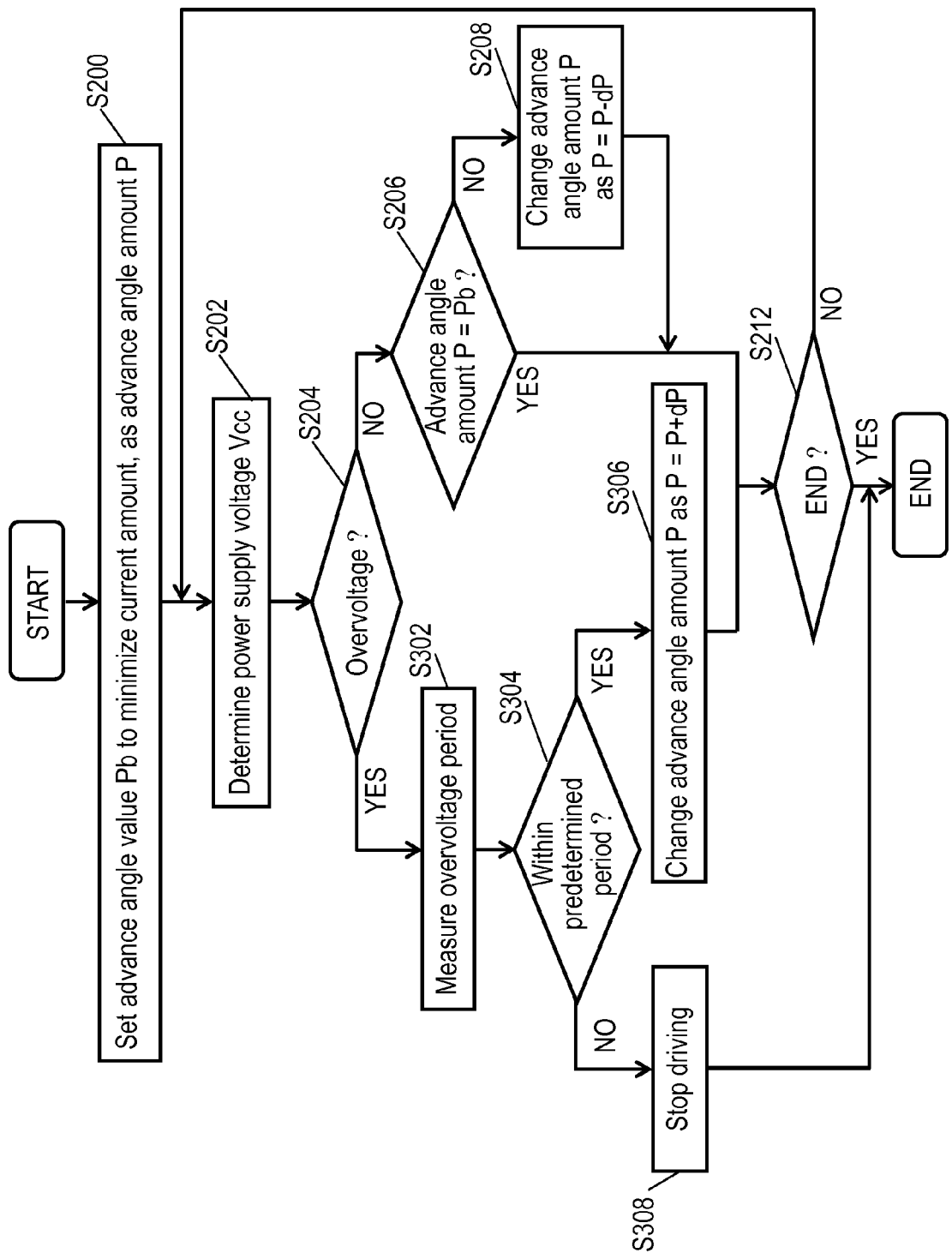
FIG. 8 is a flowchart showing one example of a procedure of a motor drive method according to the second exemplary embodiment of the present invention.

FIG. 8 is a flowchart showing one example of a procedure of a method for driving the motor in this exemplary embodiment. According to the motor drive method shown in FIG. 8, first, advance angle value Pb in which the current amount is minimum is set as advance angle amount P (step S200). Then, it is determined whether or not power supply voltage Vcc is the overvoltage exceeding the predetermined voltage (step S202). In step S202, when it is determined not to be the overvoltage, the process proceeds on to step S206, but when it is determined to be the overvoltage, the process proceeds on to step S302 (step S204).

When it is determined not to be the overvoltage, it is further determined whether or not advance angle value Pb is set as advance angle amount P (step S206). When advance angle value Pb is set as advance angle amount P, the process proceeds on to step S212. Meanwhile, when advance angle value Pb is not set as advance angle amount P, a value provided by subtracting predetermined change value dP from present advance angle amount P is set as new advance angle amount P, and the process proceeds onto step S212 (step S208).

In addition, when it is determined to be the overvoltage in step S202, the process proceeds on to step S302, and similar to timer 56, a time while it is determined to be the overvoltage is measured and an overvoltage period is measured (step S302). Then, it is determined whether or not the period while it is determined to be the overvoltage falls within a predetermined period, and when it falls within the predetermined period, the process proceeds on to step S306, and when it is beyond the predetermined period, the process proceeds on to step S308 (step S304). When it falls within the predetermined period in the determination in step S304, a value provided by adding predetermined change value dP to present advance angle amount P is set as new advance angle amount P, and the process proceeds on to step S212 (step S306). As long as a process end is not instructed from the host device, for example, the processes from step S202 to step S212 are repeated, and when the end is instructed, the process of this motor drive method is completed (step S212).

Meanwhile, when the predetermined period is exceeded in the determination in step S304, the driving operation of inverter 44 is controlled to be cut off, and inverter 44 stops driving coil 16 (step S308).

As described above, according to the method for driving the motor in this exemplary embodiment, when the power supply voltage increases due to the effect such as the noise, and exceeds the predetermined voltage, and it is determined to be the overvoltage, advance angle amount P is changed for the predetermined period to increase the current amount flowing through coil 16, and after the predetermined period, when it is still determined to be the overvoltage, the current supply to coil 16 is stopped. When this function to carry out such motor drive method is included in brushless motor 10, the voltage of power supply line Pw can be also prevented from increasing, and in addition, when the voltage increase cannot be sufficiently suppressed only by changing advance angle amount P, it is determined to be a real voltage defect and the motor drive is stopped, so that a defective operation of the motor due to the overvoltage can be prevented.

In addition, similar to the first exemplary embodiment, as one specific way for implementing this method for driving the motor, it may be configured such that a microcomputer is mounted on circuit substrate 13, and the process of each step is carried out. In addition, as other configurations, the current amount may be increased by decreasing advance angle amount P, change value dP may be the value according to power supply voltage Vcc and the voltage of the overvoltage, and the limit value such as the maximum advance angle amount Pmax may be set.

In addition, the description has been given of the case where the drive to coil 16 is stopped by the function of cutoff control unit 57 and the process in step S308, but a configuration may be provided such that as other operations to ensure safety and provide protection, the defect is informed of the host device, and the power supply to brushless motor 10 is stopped.

Third Exemplary Embodiment

Figure 9:
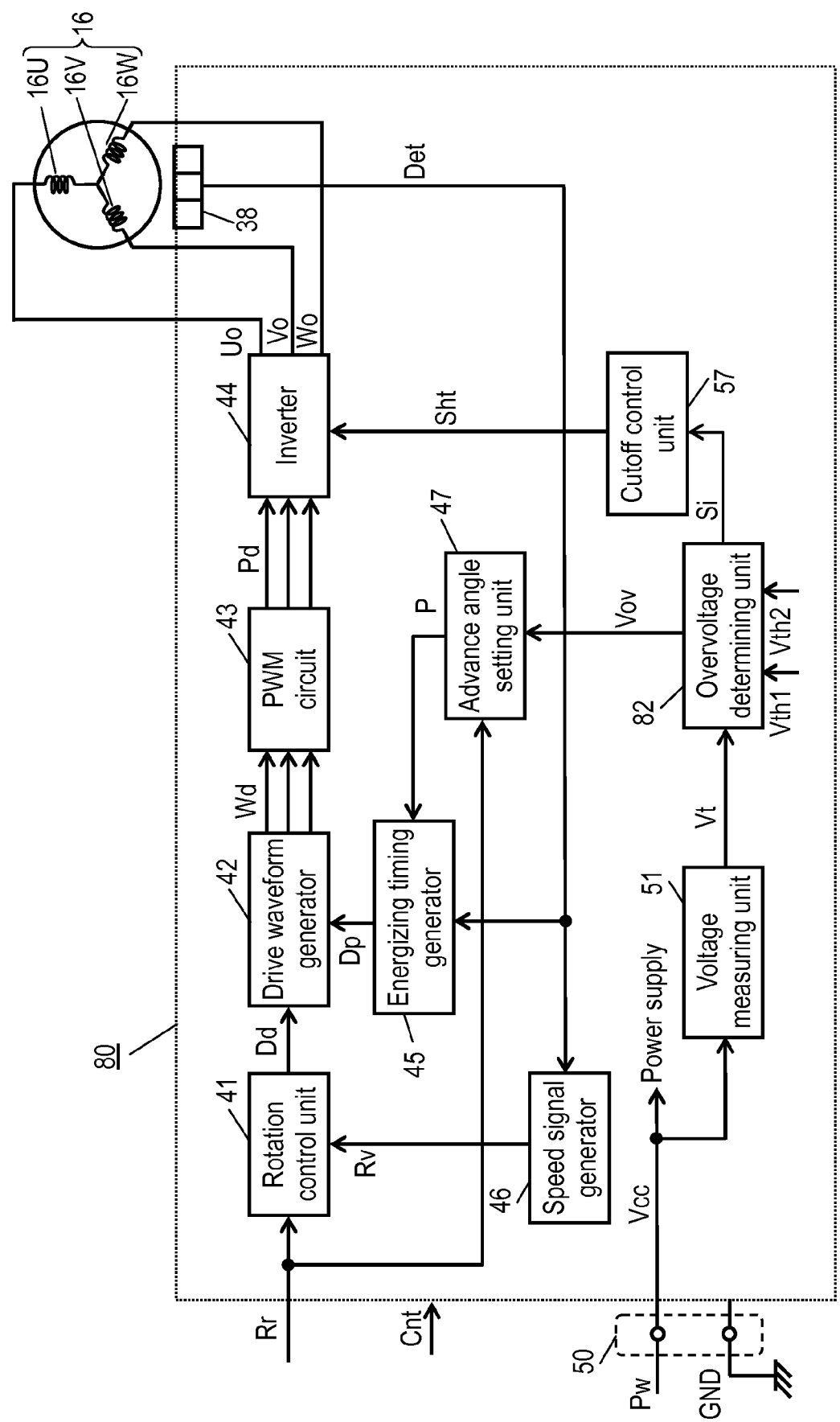
FIG. 9 is a block diagram of a motor drive device according to a third exemplary embodiment of the present invention.

FIG. 9 is a block diagram of motor drive device 80 in a third exemplary embodiment. Similar to the first and second exemplary embodiments, in this exemplary embodiment also, motor drive device 80 is incorporated or integrated in brushless motor 10 shown in FIG. 1. In FIG. 9, the same components as those in FIGS. 2 and 6 are marked with the same reference marks and their detailed description is omitted.

Compared with the first exemplary embodiment, motor drive device 80 includes overvoltage determining unit 82 for determining the overvoltage in two stages, and further includes cutoff control unit 57 similar to the second exemplary embodiment.

Similar to the first exemplary embodiment, overvoltage determining unit 82 receives power supply voltage value Vt from voltage measuring unit 51. Overvoltage determining unit 82 determines whether or not power supply voltage Vcc is the overvoltage exceeding a first predetermined voltage and whether or not it is the overvoltage exceeding a second predetermined voltage, with reference to power supply voltage value Vt. Here, the second predetermined voltage is higher than the first predetermined voltage. Overvoltage determining unit 82 determines whether or not power supply voltage Vcc is the overvoltage exceeding the first predetermined voltage, and similar to the first exemplary embodiment, applies its determined result to advance angle setting unit 47 as overvoltage determined signal Vov. In addition, when the overvoltage determining unit 82 determines that power supply voltage Vcc is the overvoltage exceeding the second predetermined voltage, it applies its determined result to cutoff control unit 57 as cutoff command signal Si. Since overvoltage determining unit 82 performs the above operations, it holds threshold voltage Vth1 indicating a voltage value as the first predetermined voltage, and threshold voltage Vth2 indicating a voltage value as the second predetermined voltage. Here, it is to be noted that Vth2>Vth1. When power supply voltage value Vt reaches the voltage value exceeding threshold voltage Vth1, it is determined that the overvoltage is at an alarm level, for example and when power supply voltage value Vt reaches the voltage value exceeding threshold voltage Vth2, it is determined that the overvoltage is at a defective level, for example. In addition, when power supply voltage value Vt is a voltage value not exceeding threshold voltage Vth1, it is determined that the overvoltage is not occurred.

According to this exemplary embodiment, motor drive device 80 is configured as described above, and when power supply voltage Vcc does not exceed the first predetermined voltage, overvoltage determining unit 82 controls advance angle setting unit 47 to set advance angle amount P to decrease the motor current, for energizing timing generator 45, as the normal operation. When power supply voltage Vcc exceeds the first predetermined voltage, overvoltage determining unit 82 determines that the overvoltage is at the alarm level, and controls advance angle setting unit 47 to set advance angle amount P to increase the current amount flowing through coil 16, for energizing timing generator 45. Furthermore, when power supply voltage Vcc exceeds the second predetermined voltage, overvoltage determining unit 82 determines that the overvoltage is at the defective level, and controls cutoff control unit 57 to cut off the driving operation of inverter 44.

According to the configuration in this exemplary embodiment, when power supply voltage Vcc becomes the overvoltage exceeding the first predetermined voltage, advance angle amount P is changed to prevent the voltage of power supply line Pw from increasing. When power supply voltage Vcc becomes the overvoltage exceeding the second predetermined voltage, it is determined to be the real voltage defect and the drive of the motor is stopped, so that the defective operation of the motor due to the overvoltage can be prevented.

In addition, in this exemplary embodiment also, motor drive device 80 may be configured to include a method for driving the motor to carry out the same function as the above.

Figure 10:
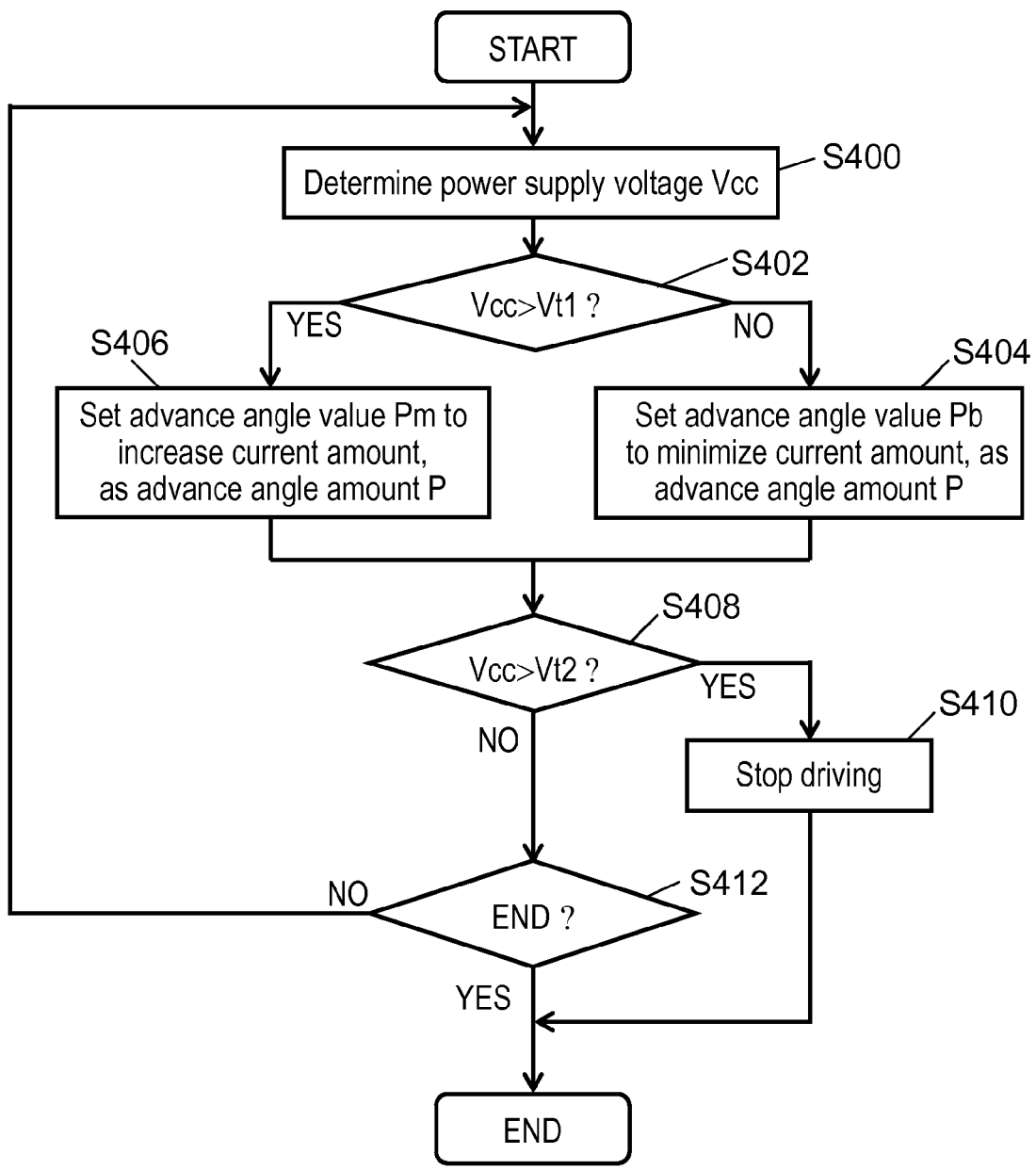
FIG. 10 is a flowchart showing one example of a procedure of a motor drive method according to the third exemplary embodiment of the present invention.

FIG. 10 is a flowchart showing one example of a procedure of the method for driving the motor according to this exemplary embodiment. Referring to FIG. 10, when a process of this motor drive method starts, it is determined whether or not power supply voltage Vcc is the overvoltage exceeding first predetermined voltage Vt1 and it is determined whether or not voltage Vcc is the overvoltage exceeding second predetermined voltage Vt2 (step S400). In addition, second predetermined voltage Vt2 is higher than first predetermined voltage Vt1. In step S400, when it is determined that voltage Vcc is not the overvoltage exceeding voltage Vt1, the process proceeds on to step S404, but when it is determined that voltage Vcc is the overvoltage exceeding voltage Vt1, the process proceeds on to step S406 (step S402). When it is determined that voltage Vcc is not the overvoltage exceeding voltage Vt1, advance angle value Pb in which the current amount is minimum as shown in FIG. 3 is set for energizing timing generator 45 as advance angle amount P (step S404). When it is determined that voltage Vcc is the overvoltage exceeding voltage Vt1, advance angle value Pm in which the current amount is increased as shown in FIG. 3 is set for energizing timing generator 45 as advance angle amount P (step S406).

Next, when it is determined that voltage Vcc is not the overvoltage exceeding voltage Vt2 in step S400, the process proceeds on to step S412 (step 408). As long as a process end is not instructed from the host device, for example, the processes from step S400 to step S412 are repeated, and when the end is instructed, the process of this motor drive method is completed (step S412).

Meanwhile, when it is determined that voltage Vcc is the overvoltage exceeding voltage Vt2 in step S400, the process proceeds on to step S410 (step 408). Then, the driving operation of inverter 44 is cut off, and the drive of coil 16 by inverter 44 is stopped (step S410).

In this way, according to the method in this exemplary embodiment, it is determined whether or not power supply voltage Vcc supplied to the motor is the overvoltage exceeding first predetermined voltage Vt1, and when it is determined to be the overvoltage exceeding voltage Vt1, advance angle amount P is changed to increase the current amount flowing through coil 16, and thus coil 16 is energized and driven. In addition, it is determined whether or not power supply voltage Vcc supplied to the motor is the overvoltage exceeding second predetermined voltage Vt2, and when it is determined to be the overvoltage exceeding voltage Vt2, the drive of coil 16 is stopped.

When the function to carry out the motor drive method is included in brushless motor 10, the voltage of power supply line Pw can be also prevented from increasing, and when the overvoltage exceeds the second predetermined voltage, it is determined to be a real voltage defect and the motor drive is stopped, so that a defective operation of the motor due to the overvoltage can be prevented.

In addition, similar to the first exemplary embodiment and the second exemplary embodiment, as one specific way for implementing this motor drive method, it may be configured such that a microcomputer is mounted on circuit substrate 13, and the process of each step is carried out. In addition, as other configurations, the current amount may be increased by decreasing advance angle amount P, and advance angle amount P is increased or decreased by change value dP.

In addition, the description has been given of the case where the drive to coil 16 is stopped by the function of cutoff control unit 57 and in the process in step S410, but a configuration may be provided such that as other operations to ensure safety and provide protection, the defect is informed of the host device, and the power supply to brushless motor 10 is stopped.

As described above, according to the motor drive method in the present invention, it is determined whether or not the power supply voltage supplied to the motor is the overvoltage exceeding the predetermined voltage, and when it is determined to be the overvoltage exceeding the predetermined voltage, the advance angle amount is changed to increase the current amount flowing through the coil, and the coil is energized and driven.

In addition, according to the motor drive device in the present invention, when the overvoltage determining unit determines that the voltage is the overvoltage exceeding the predetermined voltage, the advance angle setting unit sets the advance angle amount in which the current amount flowing through the coil is increased for the energizing timing generator.

Thus, the brushless motor in the present invention incorporates or integrates the above-described motor drive device.

According to the configuration in the present invention, when the power supply voltage increases due to the effect of the surge or noise and becomes the overvoltage exceeding the predetermined voltage, the advance angle amount is changed to increase the current amount while the present rotating operation is maintained. Thus, through this operation, the increased energy of the overvoltage is absorbed. Therefore, the present invention can provide the method for driving the motor, the motor drive device, and the brushless motor which can prevent the voltage of the power supply line from increasing, and perform the operation in a stable power supply circumstance.

INDUSTRIAL APPLICABILITY

According to the method for driving the motor, the motor drive device, and the brushless motor in the present invention, it is possible to prevent a voltage increase of the power supply line generated during energizing and driving operations, and perform the operation in a stable power supply circumstance, so that they are useful for motors used in electrical instruments, and especially suitable for being used in a car in which a power supply voltage fluctuates excessively.

REFERENCE MARKS IN THE DRAWINGS 10 brushless motor
11 stator
12 rotor
13 circuit substrate
14 motor case
14a case body
14b case lid
15 stator iron core
16 coil
16a lead-out wire
17 rotor frame
18 permanent magnet
19 bearing
20 shaft
21 supporting member
31 circuit component
38 position detecting sensor
40, 60, 70, 80 motor drive device
41 rotation control unit
42 drive waveform generator
43 PWM circuit 44 inverter
45 energizing timing generator
46 speed signal generator
47 advance angle setting unit
50 power supply terminal
51 voltage measuring unit
52, 82 overvoltage determining unit
56 timer
57 cutoff control unit
58 voltage-time conversion table

The invention claimed is:

1. A method for driving a motor that includes a stator wound with a coil and a rotor rotatably disposed and confronting the stator, the rotor being rotated by energizing and driving the coil at energizing timing of which phase is determined based on an advance angle amount, the method comprising:
determining whether or not a power supply voltage supplied to the motor exceeds a predetermined voltage, and
when it is determined that the power supply voltage exceeds the predetermined voltage, changing the advance angle amount to increase a current amount flowing through the coil for energizing and driving the coil,
wherein when it is determined that the power supply voltage exceeds the predetermined voltage, the advance angle amount is changed for a predetermined period of time to increase the current amount flowing through the coil, and when it is determined that the predetermined voltage is still exceeded after the predetermined period of time, the current to the coil is stopped.

2. The method according to claim 1, wherein when the power supply voltage does not exceed the predetermined voltage, the advance angle amount is controlled to decrease the current amount, and when it is determined that the power supply voltage exceeds the predetermined voltage, the advance angle amount is controlled to increase the current amount.

3. The method according to claim 1, wherein the rotor rotates under feedback control so that the rotor rotates in accordance with a specified rotating speed.

4. The method according to claim 1, wherein the predetermined voltage is set as a first predetermined voltage, and a second predetermined voltage is set as a voltage higher than the first predetermined voltage, it is determined whether or not the power supply voltage exceeds the first predetermined voltage, and it is determined whether or not the power supply voltage exceeds the second predetermined voltage, when it is determined that the power supply voltage exceeds the first voltage, the advance angle amount is changed to increase the current amount flowing through the coil for energizing and driving the coil, and when it is determined that the power supply voltage exceeds the second voltage is exceeded, the current to the coil is stopped.

5. A motor drive device comprising a function that carries out the method according to claim 1, wherein the coil is energized and driven at the energizing timing based on the advance angle amount.

6. A motor drive device for a motor that includes a stator wound with a coil and a rotor rotatably disposed and confronting the stator for the rotor being rotated by energizing and driving the coil at energizing timing of which phase is determined based on an advance angle amount, the motor drive device comprising:
an energizing timing generator for generating the energizing timing of the phase based on the advance angle amount;
a drive waveform generator for generating a waveform signal for driving the coil, and outputting the waveform signal at timing based on the energizing timing;
a PWM circuit for generating a drive pulse signal which is pulse width modulated by the waveform signal supplied from the drive waveform generator;
an inverter for energizing the coil based on the drive pulse signal;
an overvoltage determining unit for determining whether or not a power supply voltage supplied to the motor exceeds a predetermined voltage;
an advance angle setting unit for setting the advance angle amount to the energizing timing generator,
wherein the advance angle setting unit sets the advance angle amount to the energizing timing generator to increase a current amount flowing through the coil when the overvoltage determining unit determines that the power supply voltage exceeds the predetermined voltage; and
a cutoff control unit for cutting off a current to the coil,
wherein the overvoltage determining unit determines whether or not the power supply voltage supplied to the motor exceeds a first predetermined voltage, and further determines whether or not the power supply voltage exceeds a second predetermined voltage, the advance angle setting unit sets the advance angle amount for the energizing timing generator to increase the current amount flowing through the coil when the overvoltage determining unit determines that the power supply voltage exceeds the first predetermined voltage, and the cutoff control unit cuts off the current to the coil when the overvoltage determining unit determines that the power supply voltage exceeds the second predetermined voltage.

7. The motor drive device according to claim 6, wherein the advance angle setting unit controls the advance angle amount to decrease the current amount when the overvoltage determining unit determines that the power supply voltage does not exceed the predetermined voltage, and sets the advance angle amount to increase the current amount when the overvoltage determining unit determines that the power supply voltage exceeds the predetermined voltage.

8. The motor drive device according to claim 6, further comprising: a rotation control unit for generating a rotation control signal based on a deviation between a specified rotating speed and a detected rotating speed, wherein the drive waveform generator generates the waveform signal having an amplitude according to the rotation control signal.

9. The motor drive device according to claim 6, further comprising: a timer for measuring a lapse of a predetermined time from a time when the overvoltage determining unit determines that the power supply voltage exceeds the predetermined voltage; and a cutoff control unit for cutting off a current to the coil in accordance with a cutoff command signal, wherein the timer outputs the cutoff command signal commanding a cutoff to the cutoff control unit when it is determined that the predetermined time has elapsed.

10. A brushless motor including:
a stator wound with a coil and a rotor rotatably disposed and confronting the stator for the rotor being rotated by energizing and driving the coil at energizing timing of which phase is determined based on an advance angle amount; and
an integrated motor drive device that includes:
an energizing timing generator for generating the energizing timing of the phase based on the advance angle amount, a drive waveform generator for generating a waveform signal for driving the coil, and outputting the waveform signal at timing based on the energizing timing, a PWM circuit for generating a drive pulse signal which is pulse width modulated by the waveform signal supplied from the drive waveform generator, an inverter for energizing the coil based on the drive pulse signal, an overvoltage determining unit for determining whether or not a power supply voltage supplied to the motor exceeds a predetermined voltage, and an advance angle setting unit for setting the advance angle amount to the energizing timing generator, wherein the advance angle setting unit sets the advance angle amount to the energizing timing generator to increase a current amount flowing through the coil when the overvoltage determining unit determines that the power supply voltage exceeds the predetermined voltage; and a cutoff control unit for cutting off a current to the coil, wherein the overvoltage determining unit determines whether or not the power supply voltage supplied to the motor exceeds a first predetermined voltage, and further determines whether or not the power supply voltage exceeds a second predetermined voltage, the advance angle setting unit sets the advance angle amount for the energizing timing generator to increase the current amount flowing through the coil when the overvoltage determining unit determines that the power supply voltage exceeds the first predetermined voltage, and the cutoff control unit cuts off the current to the coil when the overvoltage determining unit determines that the power supply voltage exceeds the second predetermined voltage.

11. A method for driving a motor that includes a stator wound with a coil and a rotor rotatably disposed and confronting the stator, the rotor being rotated by energizing and driving the coil at energizing timing of which phase is determined based on an advance angle amount, the method comprising:

determining whether or not a power supply voltage supplied to the motor exceeds a predetermined voltage, when it is determined that the power supply voltage exceeds the predetermined voltage, changing the advance angle amount by adding a predetermined change value (dP) to increase a current amount flowing through the coil for energizing and driving the coil, and when it is determined that the power supply voltage does not exceed the predetermined voltage and the advance angle amount is not equal to a predetermined value (Pb), changing the advance angle amount by subtracting the predetermined change value (dP) to decrease the current amount flowing through the coil for energizing and driving the coil.

* * * * *